United States Patent
Ando et al.

(10) Patent No.: US 6,812,611 B2
(45) Date of Patent: Nov. 2, 2004

(54) PERMANENT MAGNET TYPE ELECTRIC ROTATING MACHINE

(75) Inventors: Takashi Ando, Kiryu (JP); Yasuaki Moteki, Kiryu (JP); Yuji Takagai, Kiryu (JP); Toshimi Abukawa, deceased, late of Kiryu (JP); by Tomoko Abukawa, legal representative, Kiryu (JP); Sachio Hatori, Kiryu (JP); Makoto Ochiai, Kiryu (JP)

(73) Assignee: Japan Servo Co., Ltd., Tokyo-to (JP)

( * ) Notice: Subject to any disclaimer, the term of this patent is extended or adjusted under 35 U.S.C. 154(b) by 0 days.

(21) Appl. No.: 10/618,621

(22) Filed: Jul. 15, 2003

(65) Prior Publication Data

US 2004/0061410 A1 Apr. 1, 2004

(30) Foreign Application Priority Data

Jul. 16, 2002 (JP) ..................... 2002-206365
Jun. 16, 2003 (JP) ..................... 2003-170772

(51) Int. Cl.⁷ ............................................... H02K 1/00
(52) U.S. Cl. ....................................... 310/216; 310/254
(58) Field of Search ................ 310/216–218, 310/89, 254, 258–259, 261

(56) References Cited

U.S. PATENT DOCUMENTS

| | | | |
|---|---|---|---|
| 5,128,570 A | 7/1992 | Isozaki | |
| 5,289,064 A | 2/1994 | Sakamoto | |
| 5,319,270 A | * 6/1994 | Tanaka et al. | 310/67 R |
| 5,386,161 A | 1/1995 | Sakamoto | |
| 5,583,387 A | * 12/1996 | Takeuchi et al. | 310/217 |
| 5,689,147 A | * 11/1997 | Kaneda et al. | 310/216 |
| 5,854,526 A | 12/1998 | Sakamoto | |
| 5,874,795 A | 2/1999 | Sakamoto | |
| 6,153,953 A | 11/2000 | Isozaki et al. | |
| 6,160,330 A | 12/2000 | Sakamoto | |
| 6,225,722 B1 | * 5/2001 | Rupp et al. | 310/91 |
| 6,259,176 B1 | 7/2001 | Isozaki et al. | |
| 6,605,883 B2 | 8/2003 | Isozaki et al. | |

FOREIGN PATENT DOCUMENTS

JP         2001-274284         10/2001

* cited by examiner

*Primary Examiner*—Thanh Lam
(74) *Attorney, Agent, or Firm*—Oblon, Spivak, McClelland, Maier & Neustadt, P.C.

(57) ABSTRACT

A PM-type electric rotating machine comprises a rotation axis, a rotor that rotates together with the rotation axis and a stator that rotatably supports the rotation axis. The rotor has a closed-end-cup-shaped holder that is mounted at one end of the rotation axis and a permanent magnet fixed on an inner surface of a cylindrical portion of the holder. The stator has a housing bush that supports the rotation axis in an axis hole formed through the center of the housing bush, twelve stator cores that are radially mounted around the housing bush to face the outer tip ends thereof to the permanent magnet with an air gap, and coils that are wound around the stator cores via insulators. The inner base portions of the stator cores are connected to one another with pressure so as to form a ring-shaped yoke by mounting the stator cores around the housing bush.

5 Claims, 5 Drawing Sheets

PERMANENT MAGNET TYPE ELECTRIC ROTATING MACHINE

BACKGROUND OF THE INVENTION

1. Field of the Invention

The present invention relates to an outer-rotor permanent magnet (PM) type electric rotating machine that consists of a stator having radially arranged poles with coils wound thereon and rotatably supporting a rotation axis, and a rotor arranged around the stator and holding a permanent magnet facing the poles.

2. Prior Art

Such an outer-rotor PM type electric rotating machine is disclosed in Japanese Patent Laid Open Publication No. 2001-275284, for example. The publication discloses a construction where a single-piece stator core, which is formed by a ring-shaped yoke portion and pole portions extended radially from the yoke portion, is fixed to a bearing housing with bolts as a prior art.

On the other hand, the publication discloses a construction where a separate-type stator core, which is formed by connecting separate poles to a ring-shaped yoke, is fixed to a bearing housing with bolts as an embodiment. Each of the poles has a projection formed at a base portion thereof and the yoke has channels extended in an axial direction. The poles are fixed to the yoke by fitting the projections to the channels, respectively.

However, the single-piece construction of the poles and the yoke described as the prior art in the publication exacerbates utilization efficiency of material and increases difficulty of winding operation of coils. On the other hand, the separate construction of the poles and the yoke increases a component count and the steps of working process.

SUMMARY OF THE INVENTION

An object of the present invention is to solve the above described problems of the conventional machines and to provide an improved PM-type electric rotating machine that can increase the utilization efficiency of material, decreases difficulty of winding operation of coils and decreases the component count in comparison with the prior art.

A PM-type electric rotating machine of the present invention comprises a rotation axis, a rotor that rotates together with the rotation axis and a stator that rotatably supports the rotation axis. The rotor has a closed-end-cup-shaped holder that is mounted at one end of the rotation axis and a permanent magnet fixed on an inner surface of a cylindrical portion of the holder. The stator has a housing bush that supports the rotation axis in an axis hole formed through the center thereof, stator cores that are radially mounted around the housing bush to face the outer tip ends thereof to the permanent magnet with an air gap, and coils that are wound around the stator cores via insulators. Inner base portions of the stator cores are connected to one another with pressure so as to form a ring-shaped yoke by mounting the stator cores around the housing bush.

With this construction, since the stator core is formed as separated blocks, the utilization efficiency of material becomes higher.

Further, the coil can be wound around the separated stator core before the stator core is mounted on the housing bush, which improves winding space factor, providing a compact and high-power rotating machine. Furthermore, the stator cores, which are equivalent to the poles in the prior art, are directly fixed to the housing bush without a yoke, which eliminates the need for the yoke and the bolts that fix the yoke to the housing bush, decreasing the component count in comparison with the prior art.

In order to fix the respective stator cores to the housing bush, a reentrant extending in the axial direction maybe formed on the inner surface of each stator core and external protrusions may be formed around the housing bush. In such a case, the stator cores are fixed to the housing bush by fitting the external protrusions to the reentrants and caulking the external protrusions to cause plastic deformation. This construction shows strong fixing strength of the stator cores and enables appliance to a large-torque electric rotating machine.

In addition to the above constitution, a circuit board that carries a drive circuit for the electric rotating machine can be mounted. In this case, the circuit board is preferably fixed to the outer surface of the housing bush by fitting the housing bush to a mounting hole formed on the circuit board.

Further, flat portions may be formed along an inner edge of the mounting hole of the circuit board and an outer surface of a circuit-board-mounting portion of the housing bush so that the circuit board is positioned and fixed to the housing bush by engaging the flat portions with each other. Engagement of the flat portions positions the circuit board and prevents a slip of the circuit board.

An element such as a hall element to detect excitation timing may be installed on the circuit board. Since the hall element can be accurately positioned, torque pulsation is suppressed, which will provide a low-vibration, low-noise and stable electric rotating machine.

In addition to the above constitution, a bracket, which acts as a mounting member of the electric rotating machine to fix the machine to an outside, can be attached.

In this case, the bracket is preferably fixed to the outer surface of the housing bush by fitting the housing bush to a mounting hole formed on the bracket. Further, nicks may be formed along an inner edge of the mounting hole of the bracket. The nicks are outwardly extended from the inner edge. In such a case, after fitting the bracket and the housing bush, a bracket-mounting portion of the housing bush is caulked to cause plastic deformation so that the deformed bracket-mounting portion gets into the nicks. With this fixing construction, the bracket can be strongly fixed to the housing bush without using screws or the like.

Further, the housing bush is preferably formed by die-casting of zinc or aluminum, or sintering molding of sintering material so that manufacturing after die-casting or molding is unnecessary.

DESCRIPTION OF THE ACCOMPANYING DRAWINGS

DESCRIPTION OF THE EMBODIMENTS

Figure 1:
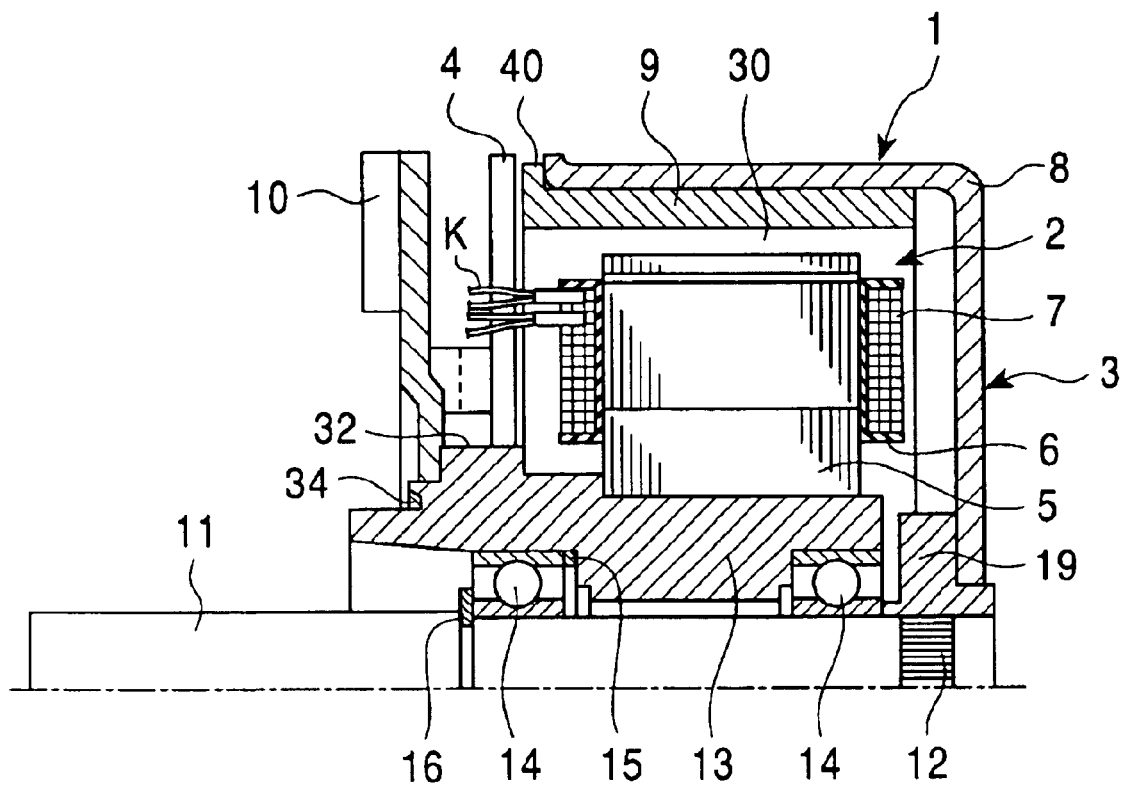
FIG. 1 is a vertical sectional view of a half portion of an outer-rotor PM-type rotational electric machine according to an embodiment of the present invention.

An embodiment of a PM-type rotational electric machine according to the present invention will be described with reference to the drawings. In this embodiment, the present invention is applied to an outer-rotor type DC-brushless motor that is driven by a three-phase control. FIG. 1 is a vertical sectional view of a half portion of the PM-type rotational electric machine of the embodiment.

In FIG. 1, the electric rotating machine 1 consists of a rotation axis 11, a stator 2 that rotatably supports the rotation axis 11 and a rotor 3 that rotates together with the rotation axis 11.

The rotor 3 has a closed-end-cup-shaped holder 8 that is made from magnetic substance and mounted at one end (right side in FIG. 1) of the rotation axis 11 via a bush 19, and a permanent magnet 9 fixed in the inner surface of a cylindrical portion of the holder 8.

The bush 19, which is made from aluminum or brass, is fitted to the holder 8, and a bush 19 is press-fitted to a knurled portion 12 of the rotation axis 11. Alternatively, the holder 8 may be directly connected to the rotation axis 11 without the bush 19.

The permanent magnet 9, which is fixed in the inner surface of the holder 8, is a plastic magnet of ferrite family that is formed into a cylindrical shape or a seat-shaped rubber magnet that is rounded as a cylinder. The permanent magnet 9 is alternately magnetized in N-pole and S-pole in a circumferential direction in a predetermined pitch corresponding to the number of poles (ten poles, for example).

The stator 2 includes a housing bush 13 that rotatably supports the rotation axis 11 in an axis hole formed through the center of the housing bush 13, stator cores 5 that are radially mounted around the housing bush 13 to face the outer tip ends thereof to the permanent magnet 9 with an air gap 3, and coils 7 that are wound around the respective stator cores 5 via insulators 6. The rotation axis 11 is supported by a couple of bearings (ball bearings) 14, 14 that are installed in the axis hole.

The stator cores 5 that are divided into a twelve portions are radially mounted around the housing bush 13 and are connected to one another to form a circular unit as a whole as described later (see FIG. 5).

Further, the position of the rotation axis 11 in a thrust direction is determined by a leaf spring 15 and a stop ring 16. That is, the leaf spring 15 is arranged at the right side of the bearing 14 of the left side in FIG. 1 to give pre-load to an outer ring of this bearing 14. The stop ring 16 is arranged at the left-side of this bearing 14 such that the stop ring 16 contacts with an inner ring of this bearing 14 to limit the movement of the rotation axis 11 in the right direction in FIG. 1.

A circuit board 4 is a printed board on which a drive circuit for the electric rotating machine 1 is implemented with electronic parts (not shown). The circuit board 4 is fixed around the housing bush 13 at the position where the circuit board 4 faces to the left edge surface 40 of the permanent magnet 9 projected from the holder 8 with an air gap. Further, a feeding terminal K of a circuit board 4 (see FIG. 1) is connected to a driving power supply (not shown).

At the left side of the circuit board 4 in FIG. 1, a bracket 10, which acts as a mounting member of the electric rotating machine 1 to fix the machine to an outside, is attached to the housing bush 13. The bracket is formed through a press-work.

Figure 2:
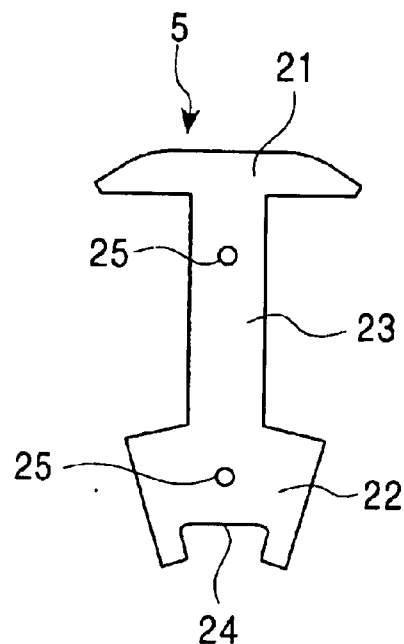
FIG. 2 is a plan view of a stator core shown in FIG. 1.

As shown in FIG. 2 that is a plane view in the axial direction, each stator core 5 has an arc-shaped wide portion 21 in the outer side, a base portion 22 at the inner side and a narrow bobbin portion 23 therebetween. The coil 7 is wound around the bobbin portion 23. The base portion 22 is formed as fan-shape such that the base portions 22 are connected with one another to form a ring-shaped yoke when the twelve stator cores 5 are radially mounted on the housing bush 13.

A reentrant 24 is formed on the inner surface of the base portion 22. The width of the reentrant 24 increases as the depths from the opening increases. The stator core 5 is formed by laminating silicon steel plates, and caulking holes 25 to join the laminated steel plates together are formed on the bobbin portion 23 and the base portion 22, respectively.

Further, since the wide portion 21 is formed flat, magnetic flux density is not suddenly changed during operation, which suppresses the cogging torque, providing a rotating machine with low pulsation torque and stable rotation.

The housing bush 13, which is a principal portion of the stator 2, is formed by die-casting of zinc or aluminum or sintering molding of sintering material so that manufacturing after die-casting or molding is unnecessary.

Figure 3:
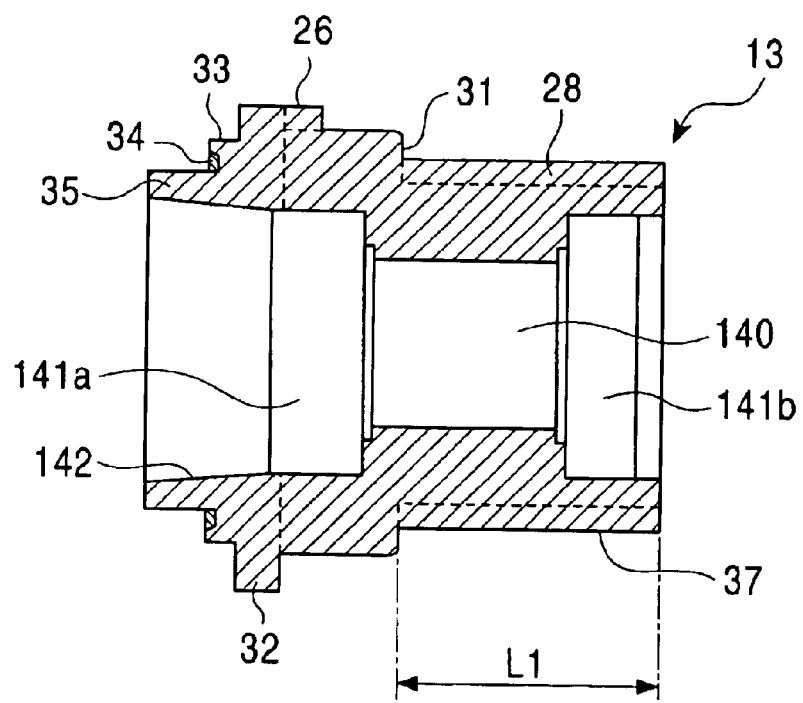
FIG. 3 is a vertical sectional view of a housing bush shown in FIG. 1.

As shown in FIG. 3, in the internal portion of the housing bush 13, an axis hole 140 through which the rotation axis 11 is inserted, a pair of large-diameter portions 141a, 141b in which the bearings 14 are arranged, and a taper hole 142 extended from the left edge shown in FIG. 3 to the large-diameter portion 141a. The diameter of the taper hole 142 decreases with the depth from the left edge. Further, the leaf spring 15 and the stop ring 16 are arranged in the large-diameter portion 141a at the left side in FIG. 3 together with the bearing 14.

On the other hand, on the outer surface of the housing bush 13, a core-mounting portion 37 with small diameter, a positioning step 31 whose diameter becomes larger by one step, the board-mounting portion 32 whose diameter becomes larger by another step, a bracket-mounting portion 33 whose diameter becomes smaller by one step and a tip portion 35 whose diameter becomes smaller by another step are formed in this order form the right side in FIG. 3.

The length of the core-mounting portion 37 is L1. External protrusions 28 extending in the axial direction are formed around the core-mounting portion 37 over the length L1.

Figure 4:
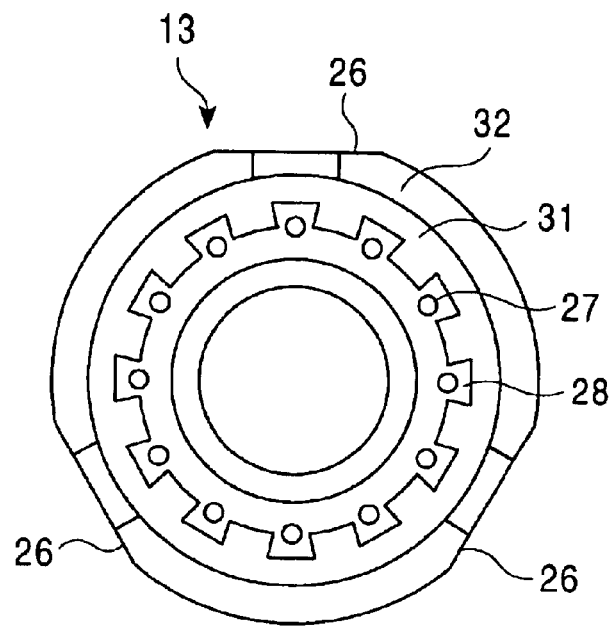
FIG. 4 is a right-front view of FIG. 3.

As shown in FIG. 4 that is a right side view of FIG. 3, the external protrusion 28 is formed so that the base portion is narrow and the tip end is wide. The shape of the external protrusion 28 is determined to fit to the reentrant 24 (see FIG. 2).

In this embodiment, the twelve external protrusions 28 are formed at regular angular intervals. Further, at root position of each external protrusion 28, a pin hole 27 is formed by an extrusion pin. The extrusion pin pushes out the molded material from die in the process of the die-casting molding. Depth of the pin hole 27 is about L1/5. Since the extrusion pin is used to form the pin hole 27, manufacturing to form a pin hole after molding becomes unnecessary.

Figure 7:
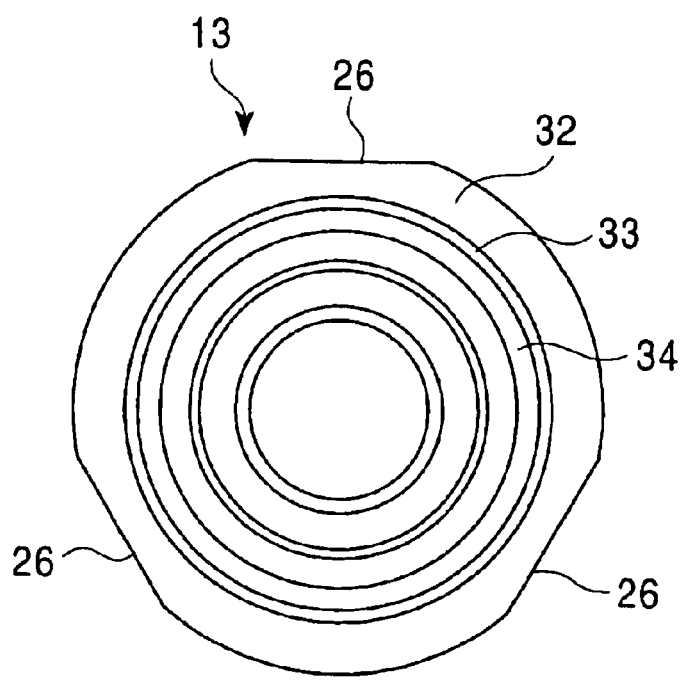
FIG. 7 is a left-front view of FIG. 3.

As shown in FIG. 4 and FIG. 7 that is a left side view of FIG. 3, three flat portions 26 are formed on the board-mounting portion 32 of a housing bush 13. On the step portion between the bracket-mounting portion 33 and the tip portion 35, a ring-shaped channel 34 is formed by digging the housing bush 13 in the axial direction.

Next, mountings of the respective members to the housing bush 13 will be described.

Figure 5:
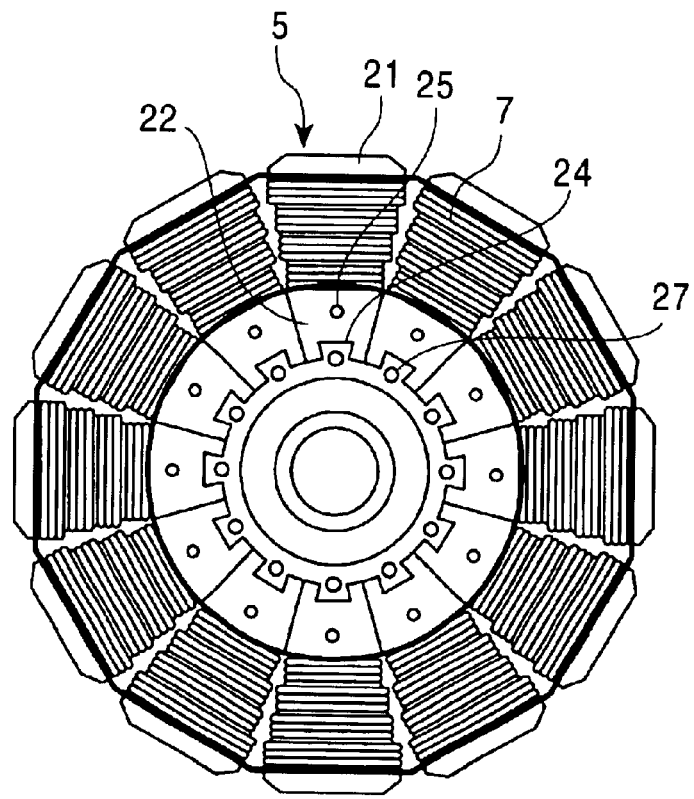
FIG. 5 is a front view in an axial direction showing a combination of the stator cores and the housing bush shown in FIG. 1.

As shown in FIG. 5, the stator core 5 around which the coil 7 is wound is mounted on the core-mounting portion 37 of the housing bush 13. When the mounting, the stator core 5 slides in the axial direction with fitting the external protrusion 28 to the reentrant 24 until the stator core 5 contacts the positioning step 31.

Figure 6:
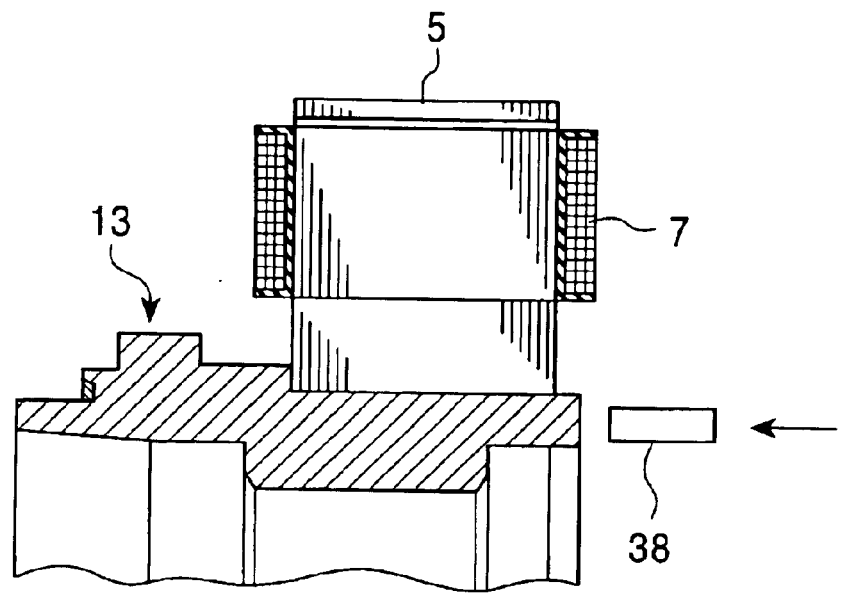
FIG. 6 is a vertical sectional view of a principal portion of FIG. 1 showing fixing method of the stator core by a caulking pin.

Twelve stator cores 5 are radially mounted on the housing bush 13. Then, the outer surfaces of the stator cores 5 are held by a centering jig (not shown) that determines a radial position. Under this condition, a caulking pin 38 is inserted from the right side in FIG. 6 and is press-fitted into the pin hole 27 (see FIG. 5) to expand the external protrusion 28. As a result, the stator cores 5 are strongly fixed to the housing bush 13.

When the twelve stator cores 5 are fixed to the housing bush 13, the base portions 22 of the respective stator cores 5 are connected with pressure so as to form a ring-shaped yoke that forms magnetic path.

Figure 8:
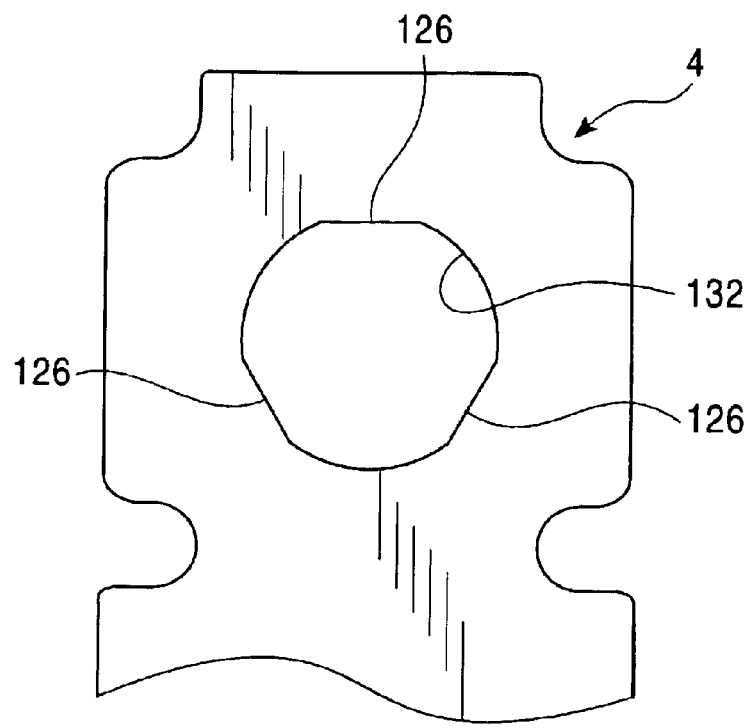
FIG. 8 is a front view of a principal portion of a circuit board shown in FIG. 1.

The circuit board 4 is fixed to the outer surface of the housing bush 13 by fitting the housing bush 13 to a mounting hole 132 (see FIG. 8) formed at the center of the circuit board 4. As shown in FIG. 7, the three flat portions 26 are formed around the circuit-board-mounting portion 32 of the housing bush 13. On the other hand, as shown in FIG. 8, three flat portions 126 are formed along the inner edge of the mounting hole 132 that correspond to the flat portions 26 of the circuit-board-mounting portion 32. The circuit board 4 is positioned and fixed to the housing bush 13 by engaging the flat portions 26 and 126 with each other.

Engagement of the flat portions 26 and 126 positions the circuit board 4 and prevents a slip of the circuit board 4. A hall element (not shown) to detect an excitation timing is installed on the circuit board 4. Since the hall element can be accurately positioned by the above construction, torque pulsation is suppressed, which will provide a low-vibration, low-noise and stable electric rotating machine. Further, the flat portion may be formed at one position or at more than three positions.

Figure 9:
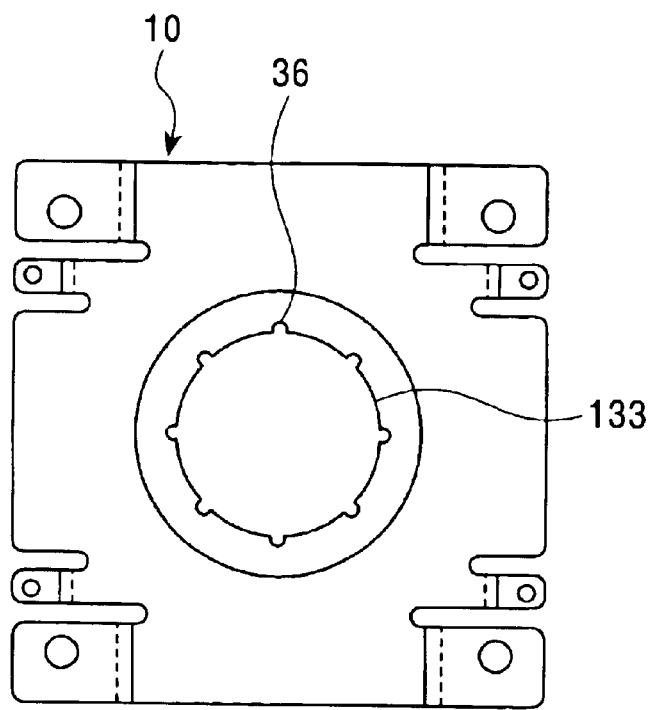
FIG. 9 is a front view of a bracket shown in FIG. 1.

The bracket 10 is fixed to the outer surface of the housing bush 13. As shown in FIG. 9, a mounting hole 133 is formed in the center of the bracket 10. Eight half-round nicks 36 are formed along the inner edge of the mounting hole 133 at regular angular intervals. The nicks 36 are outwardly extended from the inner edge. The bracket 10 is fixed to the housing bush 13 by fitting the bracket-mounting portion 33 to the mounting hole 133 and caulking the bracket-mounting-portion 33 by applying force in the axial direction to the portion being outer than the ring-shaped channel 34. As a result, a part of the bracket-mounting portion 33 is deformed and gets into the nicks 36 (causes padding to engage the nicks), which strongly fixes the bracket 10 to the housing bush 13. The number of the nicks can be freely determined and does not limited by eight.

The present invention is not limited to the above-described embodiment.

For example, a drive control may be changed from the three-phase control to another phase control such as two-phase control and the number of poles may be changed from the ten-pole.

Further, the permanent magnet 9 is not limited to the single-piece element having a cylindrical shape described in the embodiment. Divided permanent magnets may be attached on the inner surface of the cylindrical portion of the holder 8 at predetermined intervals. In such a case, the permanent magnets are alternately magnetized in N-pole and S-pole corresponding to a required number of poles.

In short, the present invention can be applied to not only the embodiment but also various alternatives of outer-rotor PM-type electric rotating machines.

Effects of the Invention

Since the present invention has the above described construction, the following superior effects can be obtained.

According to the present invention, since the stator cores are combined, the utilization efficiency of material becomes higher.

Further, the coil can be wound around the separated stator core before the stator core is mounted on the housing bush, which improves winding space factor, providing a compact and high-power rotating machine. Furthermore, the stator cores, which are equivalent to the poles in the prior art, are directly fixed to the housing bush without a yoke, which eliminates the need for the yoke and the bolts that fix a yoke to the housing bush, decreasing the component count in comparison with the prior art.

Still further, the combination of the reentrants of the stator cores and the external protrusions of the housing bush shows strong fixing strength of the stator cores and enables appliance to a large-torque electric rotating machine.

Further, when the circuit board is fixed around the circuit-board-mounting portion by engaging the flat portions formed on both sides, the circuit board can be accurately positioned and can prevent a slip of the circuit board.

Yet further, when the nicks are formed along the inner edge of the mounting hole of the bracket and the housing bush is caulked to cause plastic deformation, the deformed housing bush gets into the nicks, which strongly fixes the bracket to the housing bush. Further, since the bracket can be fixed without screws, a component count can be reduced.

Furthermore, when the housing bush is formed by die-casting or molding, manufacturing after die-casting or molding becomes unnecessary, which reduce the manufacturing cost of the electric rotating machine.

What is claimed is:

1. A permanent-magnet type electric rotating machine comprising:
    a rotation axis;
    a rotor that rotates together with said rotation axis,
    said rotor having a closed-end-cup-shaped holder that is mounted at one end of said rotation axis and a permanent magnet fixed on an inner surface of a cylindrical portion of said holder; and
    a stator that rotatably supports said rotation axis, said stator having a housing bush that supports said rotation axis in an axis hole formed through the center thereof, stator cores that are radially and directly mounted around said housing bush to face the outer tip ends thereof to said permanent magnet with an air gap and coils that are wound around said stator cores via insulators,
    wherein each said stator core has a wide base portion connected to a narrow bobbin portion around which said coil is wound, and said wide base portions of said stator cores are connected to one another with pressure so as to form a ring-shaped yoke by mounting said stator cores around said housing bush.

2. The permanent-magnet type electric rotating machine according to claim 1, wherein a reentrant extending in the axial direction is formed on the inner surface of each of said stator cores and external protrusions are formed around said housing bush, wherein said stator cores are fixed to said housing bush by fitting said external protrusions to said reentrants and caulking the external protrusions to cause plastic deformation.

3. The permanent-magnet type electric rotating machine according to claim 1 or 2, further comprising a circuit board that carries drive circuit for the electric rotating machine, said circuit board having a mounting hole formed thereon, wherein flat portions are formed along the inner edge of said mounting hole of said circuit board and outer surface of a circuit-board-mounting portion of said housing bush so that said circuit board is positioned and fixed to the housing bush by engaging said flat portions with each other.

4. The permanent-magnet type electric rotating machine according to one of claim 1 or 2, further comprising a bracket that acts as a mounting member of the electric rotating machine to fix the machine to an outside, said bracket having a mounting hole formed thereon, wherein nicks are formed along the inner edge of said mounting hole of said bracket, said nicks are outwardly extended from the inner edge, and wherein said bracket is fixed to said housing bush by engaging the bracket to the housing bush and caulking a bracket-mounting portion of said housing bush to cause plastic deformation so that the deformed bracket-mounting portion gets into said nicks.

5. The permanent-magnet type electric rotating machine according to one of claim 1 or 2, wherein said housing bush is formed by die-casting of zinc or aluminum, or sintering molding of sintering material so that manufacturing after die-casting or molding is unnecessary.

* * * * *

UNITED STATES PATENT AND TRADEMARK OFFICE
CERTIFICATE OF CORRECTION

PATENT NO. : 6,812,611 B2 Page 1 of 1
DATED : November 2, 2004
INVENTOR(S) : Ando et al.

It is certified that error appears in the above-identified patent and that said Letters Patent is hereby corrected as shown below:

<u>Title page</u>,
Item [75], Inventors, should read:
-- [75] Inventors: Takashi Ando, Kiryu (JP); Yasuaki Motegi, Kiryu (JP); Yuji Takagai, Kiryu (JP); Toshimi Abukawa, Deceased, late of Kiryu (JP); by Tomoko Abukawa, legal representative, Kiryu (JP); Sachio Hatori, Kiryu (JP), Makoto Ochiai, Kiryu (JP) --

Signed and Sealed this

Fifteenth Day of February, 2005

JON W. DUDAS
*Director of the United States Patent and Trademark Office*